(12) United States Patent
Scheuerman et al.

(10) Patent No.: US 8,312,637 B2
(45) Date of Patent: Nov. 20, 2012

(54) ALIGNMENT TOOL FOR REPLACEMENT OF ULTRASONIC WELDER HORN

(75) Inventors: Robert J. Scheuerman, Washington, MI (US); Rick F. Rourke, Metamora, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 354 days.

(21) Appl. No.: 12/818,239

(22) Filed: Jun. 18, 2010

(65) Prior Publication Data

US 2011/0308736 A1  Dec. 22, 2011

(51) Int. Cl.
 *G01B 5/25* (2006.01)
(52) U.S. Cl. ............................................. 33/613; 33/626
(58) Field of Classification Search .................... 33/613, 33/626, 638, 645
See application file for complete search history.

(56) References Cited

U.S. PATENT DOCUMENTS

| | | | | |
|---|---|---|---|---|
| 1,337,293 A * | 4/1920 | Toups | ............................. | 33/613 |
| 2,526,723 A * | 10/1950 | Berkeley | ........................ | 33/657 |
| 2,775,819 A * | 1/1957 | Kalbow et al. | .................. | 33/645 |
| 2,803,883 A * | 8/1957 | Morano | .......................... | 33/529 |
| 3,804,391 A * | 4/1974 | Case | ............................. | 33/27.03 |
| 4,586,264 A * | 5/1986 | Zatezalo | ......................... | 33/412 |
| 4,964,224 A * | 10/1990 | Jackson | ......................... | 33/645 |
| 5,185,937 A * | 2/1993 | Piety et al. | ..................... | 33/645 |
| 5,371,953 A * | 12/1994 | Nower et al. | ................... | 33/645 |
| 2010/0319209 A1* | 12/2010 | Nakamura et al. | .............. | 33/645 |
| 2012/0024068 A1* | 2/2012 | Silliman et al. | ................ | 33/645 |

* cited by examiner

*Primary Examiner* — G. Bradley Bennett

(57) ABSTRACT

An alignment tool determines the parallelism between the anvil face of an anvil of an ultrasonic welder and the horn faces of a replacement horn mounted on the welder by a rotary mount. The tool includes a tool base having a face plate contacting with the anvil face and a clamp for clamping the tool base on the anvil. A plate member is mounted on the tool base for swiveling movement and contacts the horn faces. Springs urge the plate member into contact with the horn faces while the replacement horn is rotated relative to the anvil. Transducers sense the relative positions between the face plate and the plate member so that the repairman can determine that the replacement horn has been rotated to the desired position in which the horn face has become parallel with the anvil face. Then the replacement horn can then be tightened against further rotation.

19 Claims, 4 Drawing Sheets

ALIGNMENT TOOL FOR REPLACEMENT OF ULTRASONIC WELDER HORN

FIELD OF THE INVENTION

The present invention relates to the replacement of a horn assembly of an ultrasonic welder and more particularly provides an alignment tool for obtaining parallelism between the replacement horn and the stationary anvil of the ultrasonic welder.

BACKGROUND OF THE INVENTION

It is known in the manufacture of metal and plastic products to utilize an ultrasonic welding process for the welding together of materials. The ultrasonic welder includes a stationary anvil and a vibrating horn assembly. The pieces of material that are to be welded together are clamped between the stationary anvil and the vibrating horn assembly and the rapid vibration of the horn will vibrate the materials causing the formation of a weld there between.

Because of the rapid vibration, the horn will eventually experience wear and need to be replaced. Upon replacement, the newly installed horn must be precisely adjusted relative to the stationary anvil to obtain precise parallelism between the face of the horn in the face of the anvil.

Trial and error is traditionally employed to adjust the newly installed replacement horn. In particular, test coupons are welded together and the welds are examined to determine whether quality of the weld shows that the horn and the anvil are parallel with one another. If the examination of the test coupon shows that the proper weld has not been obtained, then the tool repairmen will adjust the rotary position of the horn and make another test. This trial and error method for adjusting the replacement horn is time-consuming and thus undesirable in obtaining efficient manufacture of ultrasonic welded products.

It would be desirable to provide a tool that would accomplish the precise parallel alignment of the horn with the anvil upon replacement of the horn assembly.

SUMMARY OF THE INVENTION

An alignment tool determines the parallelism between the anvil face of an anvil of an ultrasonic welder and the horn faces of a replacement horn mounted on the welder by a rotary mount. The tool includes a tool base having a face plate contacting with the anvil face and a clamp for clamping the tool base on the anvil. A plate member is mounted on the tool base for swiveling movement and contacts the horn faces. Springs urge the plate member into contact with the horn faces while the replacement horn is rotated relative to the anvil. Transducers sense the relative positions between the face plate and the plate member so that the repairman can determine that the replacement horn has been rotated to the desired position in which the horn faces has become parallel with the anvil face. Then the replacement horn can then be tightened against further rotation.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings.

DETAILED DESCRIPTION OF THE EXEMPLARY EMBODIMENTS

The following description of certain exemplary embodiments is merely exemplary in nature and is not intended to limit the invention, its application, or uses.

Figure 1:
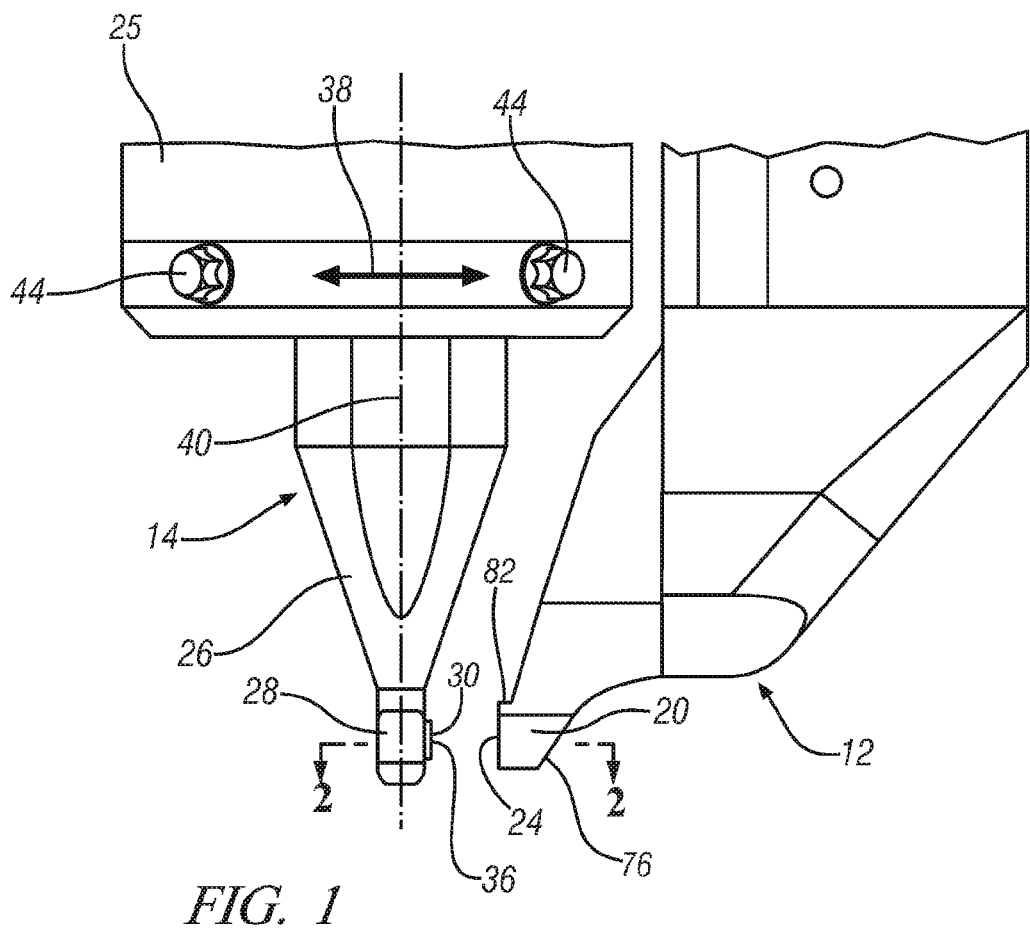
FIG. 1 is an elevation view of an ultrasonic welder.

Referring to FIG. 1 an ultrasonic welder 10 is shown. The welder 10 includes an anvil assembly, generally indicated at 12, and a sonotrode horn assembly, generally indicated at 14. The anvil assembly 12 is mounted on a stationary machine base and includes an anvil 20 that is bolted onto the machine base. The anvil 20 has an anvil face 24.

Figure 2:
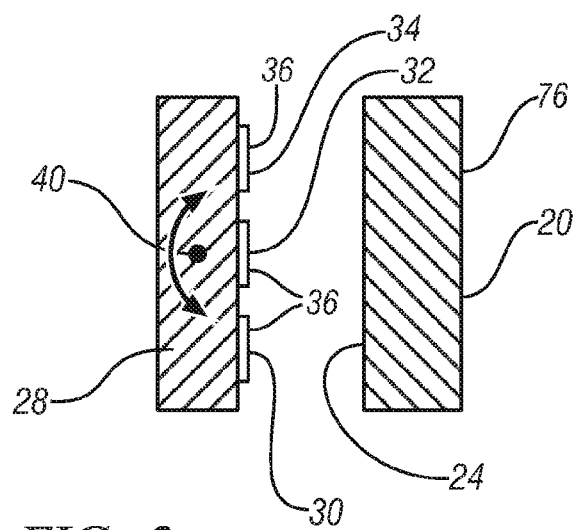
FIG. 2 is a section view taken in the direction of the rose 2—two of FIG. 1.

The sonotrode horn assembly 14 is mounted on the machine base by a head piece 25 and includes a support 26 that carries a horn 28. As best seen in FIGS. 1 and 2, the horn 28 carries horn buttons 30, 32 and 34 that are spaced along the width of the horn 28. Each of the horn buttons 30, 32 and 34 has a knurled horn face 36 for gripping the surface of a material that is to be welded. The sonotrode horn assembly 14 is moveable toward and away from the anvil assembly 12 in the direction of arrows indicated at 38 so that the horn faces 36 can be moved either toward the anvil face 24 or away from the anvil face 24 to clamp the layers of material that are to be welded. The ultrasonic welder includes a vibratory mechanism that vibrates the horn 28 at high frequency.

During use of the ultrasonic welder, the sonotrode horn 14 moves in the direction of the arrows 38 to clamp a pair of members, such as a pair of battery terminals, not shown, between the anvil face 24 and the horn faces 36. Then the sonotrode horn 14 is vibrated at high speed and the two members to be welded are vibrated together with such force and speed as to create a weld nugget between the members.

From time to time the support 26 and horn 28 will need to be replaced because the wear experienced by the horn buttons 30, 32, and 34 will degrade the knurled horn faces 36. The replacement is accomplished by removing or loosening the mounting bolts 44 that retain the support 26 on the head piece 25. Then a new support 26 and horn 28 are installed and the bolts 44 are tightened.

Upon replacement of the support 26 and horn 28, sonotrode horn assembly 14 must be accurately aligned with the anvil 20 so that the horn faces 36 will be exactly parallel with the anvil face 24. This parallel alignment is obtained by rotating the sonotrode horn 14 relative the head piece 25 about the axis designated 40 in FIGS. 1 and 2, and then tightening the adjusting bolts 44.

Traditionally, trial and error has been employed in order to obtain the parallel alignment of the horn faces 36 with the anvil face 24. In such a trial and error procedure, test coupons are inserted, and a test weld is made. And then the quality of the weld is examined to determine whether the proper parallel alignment has been achieved between the horn faces 36 and anvil face 24. If the requisite quality weld has not been achieved, the bolts 44 will be loosened and the support 26 and horn 28 will be rotated a bit about the vertical axis 40 and the bolts 44 tightened. Then another test coupon will be welded. This trial and error process will continue until welds of acceptable quality are achieved.

Figure 3:
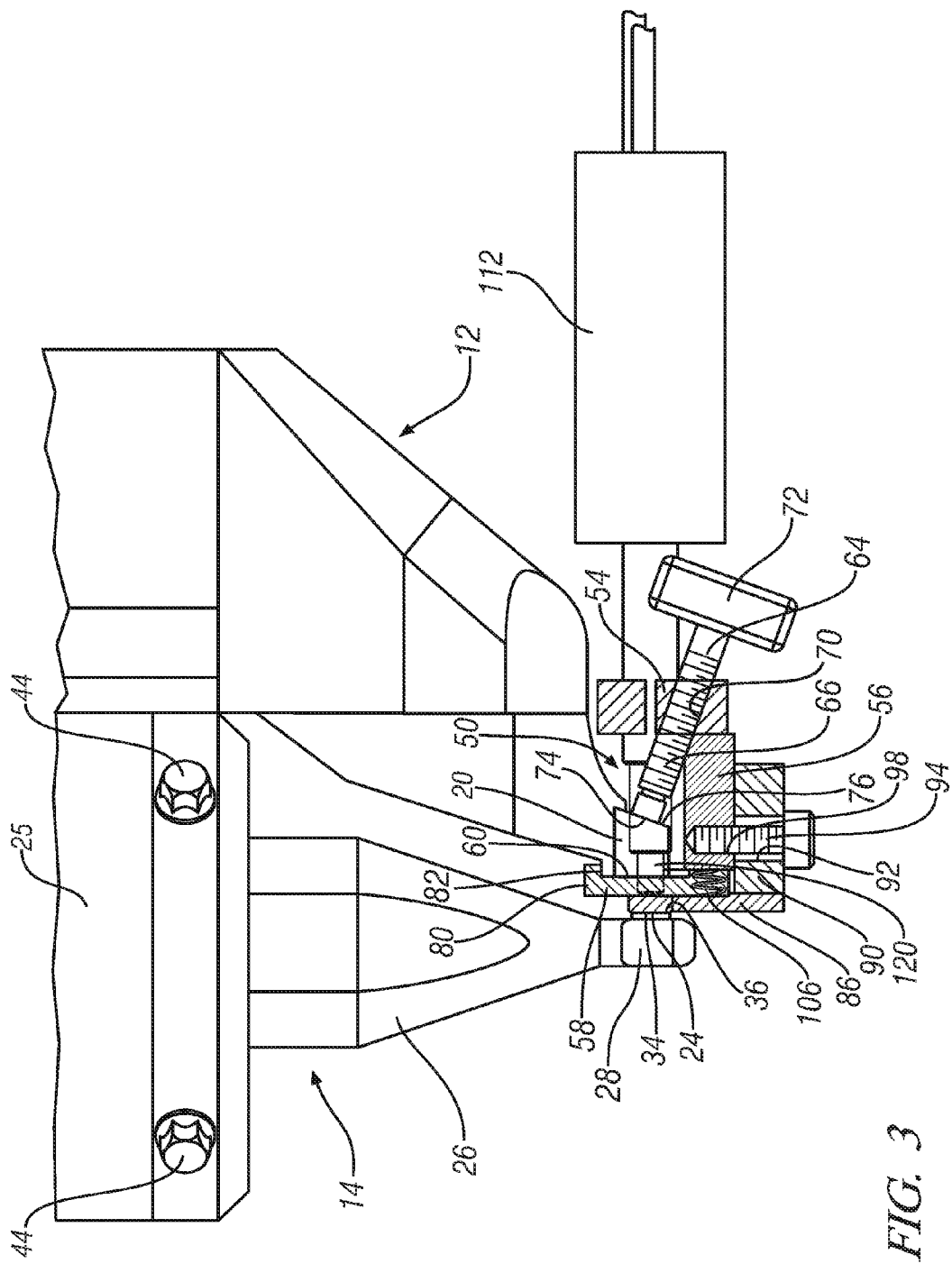
FIG. 3 shows an alignment tool attached to the ultrasonic welder, with parts broken away and in section to show the construction of the tool at center line of the tool.
Figure 4:
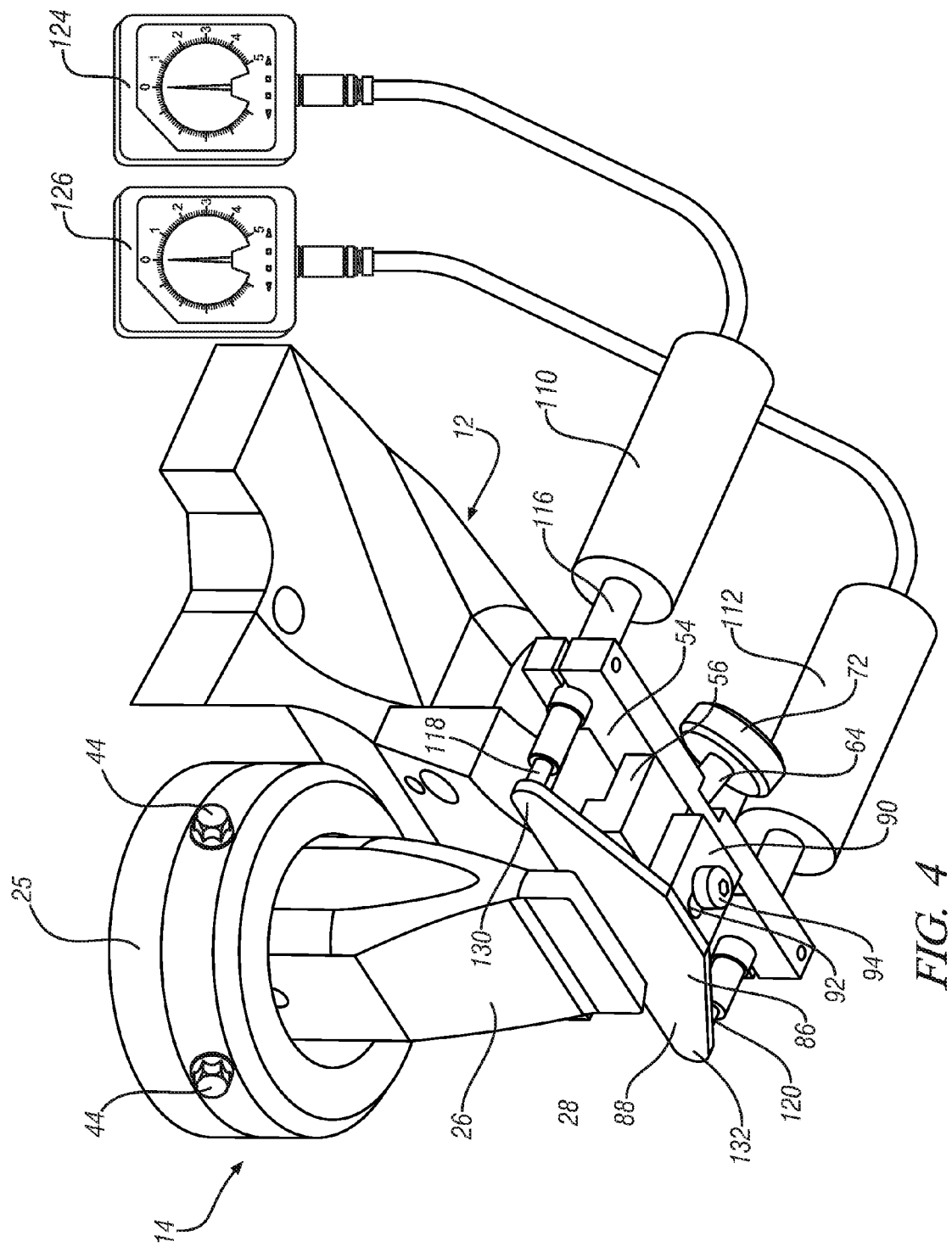
FIG. 4 is a perspective view of the alignment tool clamped onto the ultrasonic welder.
Figure 5:
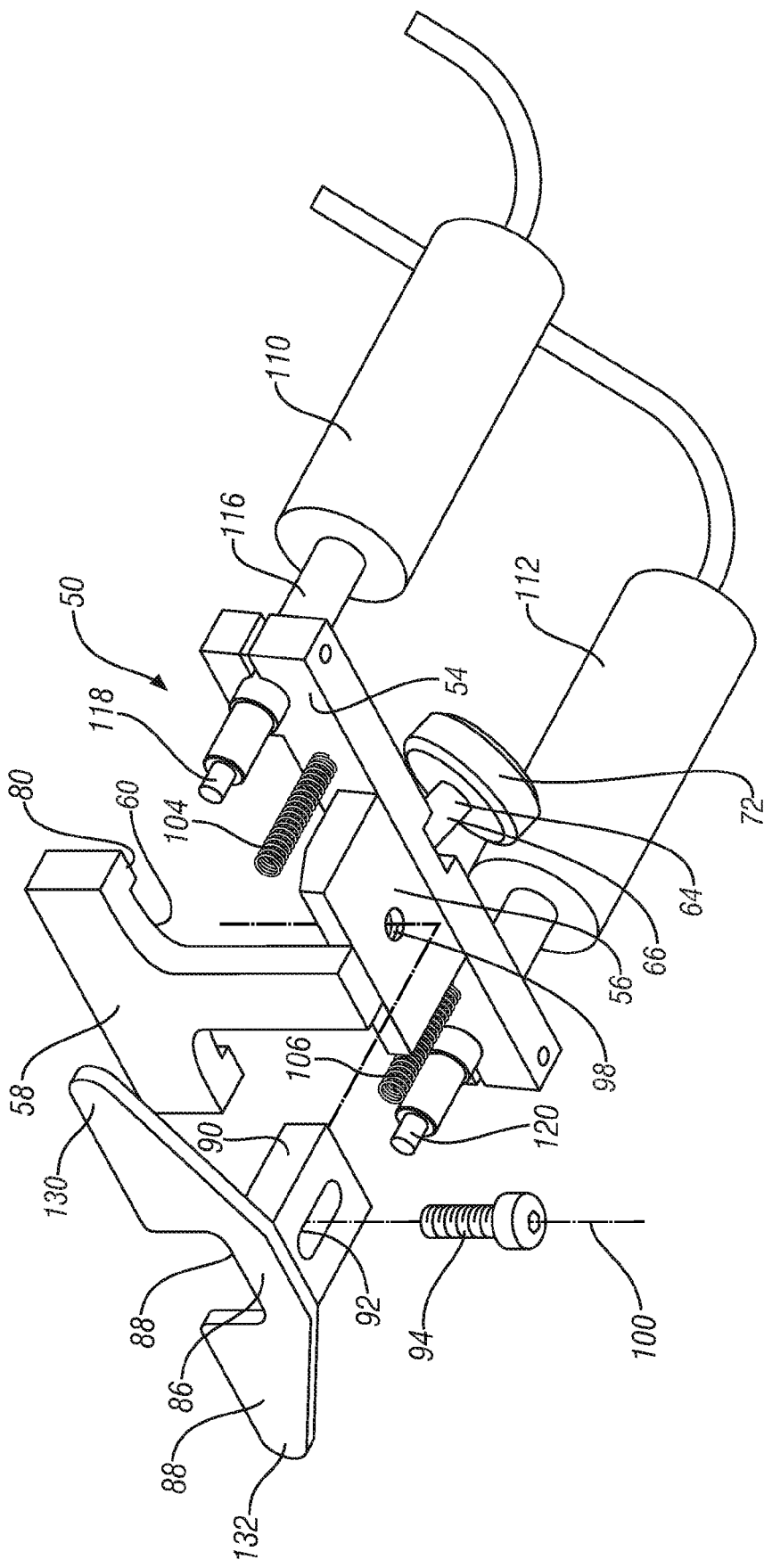
FIG. 5 is an exploded view of the alignment tool.

Referring to FIGS. 3, 4, and 5, an alignment tool 50 is provided for obtaining precise parallel alignment of the horn 28 with the anvil 20, thereby avoiding the time-consuming and repetitious trial and error method that was previously necessary.

Referring to the drawings, FIGS. 3 and 4 show the alignment tool 50 installed on the ultrasonic welder in readiness for aligning the horn 28 with the anvil 24. FIG. 5 is an exploded view that best shows the structure and components of the alignment tool 50.

As seen in FIG. 5 the alignment tool 50 includes a tool base 54 that has an extension 56. A face plate 58 is attached to the extension 56 of tool base 54, either by welds or bolts, not shown, and includes a tool face 60 that is adapted to abut against the anvil face 24, as best seen in FIG. 3.

A clamp 64 is provided for clamping the tool base 54 onto the anvil assembly 12. As best seen in FIG. 3, the clamp 64 includes a threaded shaft 66 that is threaded into a threaded aperture 70 in the tool base 54. A knob 72 is provided on the end of the threaded shaft 66 so that the threaded shaft 66 can be rotated to carry its clamping end 74 into engagement with the backside 76 of the anvil 20. The face plate 58 has a shoulder portion 80 that rests upon a ledge portion 82 of the anvil 20. Thus, as seen in FIG. 3 the operator will install the alignment tool 50 onto the anvil assembly 12 by positioning the face plate 58 against the anvil face 24, with the shoulder portion 80 resting on the ledge portion 82 of the anvil 20. Then the knob 72 is rotated to advance the threaded shaft 64 so that shaft end 74 engages against the backside 76 of the anvil 20. In this manner, the alignment tool 50 is mounted onto the stationary anvil 20 the ultrasonic welder 10.

As best seen in FIGS. 4 and 5, the alignment tool 50 also includes a plate member 86 that has a plate face 88 for abutting against the horn faces 36 of the horn 28. The plate member 86 is attached to a mounting bracket 90 by screws or welds, not shown. The mounting bracket 90 has an elongated slot 92 that receives a bolt 94 which is threaded into a bolt hole 98 on the extension 56 of the tool base 54. The slot 92 is oversized relative the diameter of the bolt 94 so that the mounting bracket 90 and plate member 86 is free to swivel about a vertical axis 100 defined by the bolt 94.

As best seen in FIG. 5, coil compression springs 104 and 106 are mounted on the tool base 54 on each side of the extension 56. As best seen in FIG. 3, these coil compression springs 104 and 106 bear against the plate member 86 to urge the plate face 88 of the plate member 86 into contact with the horn faces 36 of the horn 28. The swiveling of the plate member 86 allows the plate member 86 to be in contact with the horn faces 36 irrespective of the rotary position of the horn assembly 14 about the vertical axis 40. FIG. 5 shows that the plate member 86 has a cutout 108 so that the plate member 86 will contact with the horn face 36 of the endmost horn buttons 30 and 34, and not the center button 32.

Referring again to FIG. 4, it is seen that a pair of linear transducers assemblies 110 and 112 are also mounted on the tool base 54, outboard of the coil compression springs 104 and 106. The linear transducer 110 includes a housing 116 that is mounted on the tool base 54 and a probe 118 that is slideable within the housing 116. The probe 118 projects from the housing 116 under the influence of a spring that is provided inside the housing 116 and not shown in the drawing. As seen in FIG. 3, the probe 118 projects into contact with the plate member 86. The linear transducer 112 is constructed identical to the linear transducer 110 and includes a probe 120 that is also engaging with the plate member 86. As best seen in FIG. 4, a dial indicator 124 is connected to the linear transducer 110, and a dial indicator 126 is connected to the linear transducer 112. It will be appreciated that by reading the dial indicators 124 and 126 a repairman will be able to determine relative positions between the face plate 58 engaging the anvil face 24 and the plate member 86 that is engaging with the horn faces 36. In addition, as best seen in FIG. 4, the plate member 86 is substantially wider than the width of the horn 28, so that the plate member 86 has outboard ends 130 and 132 that are engaged by the probes 118 and 120. Thus it will be appreciated that by having the plate member 86 extend to a greater width than the width of the horn 28, the position of the outboard ends 130 and 132 will amplify the readings that are obtained by the transducers 110 and 112, thereby making it easier to determine the rotary position of the horn assembly 14 about the vertical axis 40.

Operation

After repeated use of the ultrasonic welder 10, the horn 28 will become worn and need to be replaced. In particular, the knurled horn faces 36 become worn. The bolts 44 are loosened which allows the horn support 26 and horn 28 to be removed from the head piece 25 and replaced with a new support 26 and horn 28. The support 26 is able to rotate within the head piece 25 until the bolts 44 are tightened. The support 26 and horn 28 must be adjusted to a precise rotary position about the vertical axis 40 in order to obtain parallelism between the horn faces 36 and the anvil face 24.

This parallelism is obtained by use of the alignment tool 50. In particular the alignment tool 50 is mounted on the anvil assembly 12 as described above. The coil compression springs 104 and 106 will urge the plate member 86 into contact with the horn faces 36. The operator then reads the dial indicators 124 and 126 to determine the orientation of the plate member 86 as it engages with the horn faces 36. The dial indicators 124 and 120 have preferably been zeroed out so that the dial indicators will reach the zero reading as shown in FIG. 4 when the rotation of the support 26 and the horn 28 about the vertical axis 40 has obtained a parallel relationship between the positions of the face plate 58 engaging with the anvil face 24 and the plate member 86 contacting engaging with the horn faces 36. Upon obtaining the proper parallel relationship between the horn 28 and the anvil 20, the bolts 44 are completely tightened and the tool alignment tool can be removed by loosening the clamp 64.

Thus, in view of foregoing it will be understood that the alignment tool 50 of this invention provides a fast and reliable rotary alignment of the replacement horn assembly 14, eliminating the time-consuming trial and error alignment methodology previously used.

What is claimed is:

1. An alignment tool for determining the parallelism between the anvil face of an anvil that is fixedly mounted on an ultrasonic welder and the horn faces of a replacement horn that is adjustably mounted on the welder by a rotary mount, so that the replacement horn can be rotated to an aligned position parallel with the anvil face and then fixed in place on the welder against further rotation; comprising:
   a tool base;
   the tool base having a face plate with a tool face for contacting with the anvil face;
   a clamp for clamping the tool base on the anvil so that the that tool face is contacting with the anvil face;

a plate member mounted on the tool base for swiveling movement, said plate member having a plate face for contacting with the horn faces;

at least one spring acting between the tool base and the plate member to urge swiveling movement of the plate member so that the plate face of the plate member is held by the spring force in contact with the ss while the replacement horn is rotated relative to the anvil;

and at least one transducer sensing the relative positions between the tool face contacting with the anvil face and the plate face contacting with the horn faces so that the repairman can determine that the replacement horn has been rotated to the desired position in which the horn face has become parallel with the anvil face and the replacement horn can then be tightened against further rotation.

2. The alignment tool of claim 1 further comprising the face plate having a shoulder that rests upon the anvil.

3. The alignment tool of claim 1 further comprising the plate member having first and second outboard ends that extend outboard substantially beyond the plate member.

4. The alignment tool of claim 3 further comprising the at least one transducer being first and second linear transducers contacting respectively with the first and second outboard ends of the plate member.

5. The alignment tool of claim 1 further comprising the transducer being at least one linear transducer engaging with the plate member to sense the position of the plate member.

6. The alignment tool of claim 1 further comprising the clamp including a threaded shaft that is turned by a knob to engage with the anvil.

7. The alignment tool of claim 1 further comprising the face plate having a shoulder that engages the anvil and the clamp includes a threaded shaft that is turned by a knob to engage with the anvil to retain the face plate in engagement with the anvil face and thereby mount the alignment tool on the anvil.

8. The alignment tool of claim 7 further comprising the plate member having outboard ends extending substantially beyond the contact of the plate member with the horn faces, and first and second linear transducers respectively contacting with the first and second outboard ends of the plate member to sense the position of the horn faces.

9. The alignment tool of claim 1 further comprising the swivel mount between the plate member and the tool base being provided by a slot in the plate member and a bolt extending through the slot and threaded into the tool base.

10. The alignment tool of claim 1 in which the at least one spring acting between the tool base and the plate number is comprised of first and second coil compression springs acting between the plate member and the tool base.

11. The alignment tool of claim 1 further comprising a dial indicator for indicating the position sensed by the at least one transducer.

12. The alignment tool of claim 1 further comprising the plate member having outboard ends extending substantially beyond the contact of the plate member with the horn and first and second linear transducers respectively contacting with the first and second outboard ends of the plate member to sense the position of the horn faces, and a dial indicator associated with each of the transducers so that the repairman can read the dial indicators to determine the rotary position of the horn faces relative the anvil face.

13. An alignment tool for determining the parallelism between the anvil face of an anvil that is fixedly mounted on an ultrasonic welder and the horn faces of a replacement horn that is adjustably mounted on the welder by a rotary mount, so that the replacement horn can be rotated to an aligned position parallel with the anvil face and then fixed in place on the welder against further rotation; comprising:

a tool base;

the tool base having a base plate with a tool face for abutting against the anvil face;

a clamp for clamping the tool base on the anvil so that the that tool face is contacting with the anvil face;

a plate member mounted on the tool base for swiveling movement about an axis that is parallel with the axis of rotation of the horn, said plate member having a plate face that is contacts with the horn faces and first and second outboard plate member ends that extend on opposite sides beyond the plate face;

at least one spring acting between the tool base and the plate member to urge swiveling movement of the plate member so that the plate face is held by the spring force in contact with the horn faces while the replacement horn is swiveled relative to the anvil;

and first and second linear transducers mounted on the tool base and having probes that are biased into contact respectively with the first and second outboard plate member ends, said transducers sensing the relative positions between the tool face and the plate face so that the repairman can determine that the replacement horn has been rotated to the desired position in which the horn faces have become parallel with the anvil face and the repairman can then fix the replacement horn against further rotation.

14. The alignment tool of claim 13 further comprising the clamp including a threaded shaft that is turned by a knob to engage with the anvil.

15. The alignment tool of claim 13 further comprising the face plate having a shoulder that engages the anvil and the clamp includes a threaded shaft that is turned by a knob to engage with the anvil to retain the face plate in engagement with the anvil face and thereby mount the alignment tool on the anvil.

16. The alignment tool of claim 13 further comprising the swivel mount between the plate member and the tool base being provided by a slot in the plate member and a bolt extending through the slot and threaded into the tool base.

17. The alignment tool of claim 13 in which the at least one spring acting between the tool base and the plate number is comprised of first and second coil compression springs acting between the plate member and the tool base.

18. The alignment tool of claim 13 further comprising a dial indicator associated with each of the first and second transducers so that the repairman can read the dial indicators to determine the rotary position of the horn faces relative the anvil face.

19. An alignment tool for determining the parallelism between the anvil face of an anvil that is fixedly mounted on an ultrasonic welder and the horn faces of a replacement horn that is adjustably mounted on the welder by a rotary mount, so that the replacement horn can be rotated to an aligned position parallel with the anvil face and then fixed in place on the welder against further rotation; comprising:

a tool base;

the tool base having a base plate with a tool face for abutting against the anvil face;

a clamp for clamping the tool base on the anvil so that the tool face is contacting with the anvil face, said clamp including a threaded shaft that is turned by a knob to engage with the anvil;

a plate member mounted on the tool base for swiveling movement about an axis that is parallel with the axis of rotation of the horn, said plate member having a plate face that contacts with the horn faces and first and second outboard plate member ends that extend on opposite sides beyond the plate face; said swiveling movement between the plate member and the tool base being provided by a slot in the plate member and a bolt extending through the slot and threaded into the tool base;

first and second springs acting between the plate member and the tool base so that the plate face is held by the spring force in contact with the horn faces while the replacement horn is swiveled relative to the anvil;

and first and second linear transducers mounted on the tool base and having probes that are biased into contact respectively with the first and second outboard plate member ends, said transducers sensing the relative positions between the tool face and the plate face so that the repairman can determine that the replacement horn has been rotated to the desired position in which the horn faces have become parallel with the anvil face and the repairman can then fix the replacement horn against further rotation.

* * * * *